US012524703B2

United States Patent
Zhou et al.

(10) Patent No.: US 12,524,703 B2
(45) Date of Patent: Jan. 13, 2026

(54) DEVICE FOR AND METHOD OF AUTOMATING MACHINE LEARNING BASED ON A REPRESENTATION OF A MACHINE LEARNING PIPELINE

(71) Applicant: Robert Bosch GmbH, Stuttgart (DE)

(72) Inventors: Baifan Zhou, Leonberg (DE); Evgeny Kharlamov, Munich (DE); Tim Pychynski, Karlsruhe (DE); Yulia Svetashova, London (GB)

(73) Assignee: Robert Bosch GmbH, Stuttgart (DE)

( * ) Notice: Subject to any disclaimer, the term of this patent is extended or adjusted under 35 U.S.C. 154(b) by 1056 days.

(21) Appl. No.: 17/448,487

(22) Filed: Sep. 22, 2021

(65) Prior Publication Data

US 2022/0114486 A1    Apr. 14, 2022

(30) Foreign Application Priority Data

Oct. 12, 2020 (EP) .................................. 20201313

(51) Int. Cl.
*G06F 18/24* (2023.01)
*G06F 16/901* (2019.01)
(Continued)

(52) U.S. Cl.
CPC ......... *G06N 20/00* (2019.01); *G06F 16/9024* (2019.01); *G06F 18/214* (2023.01); *G06F 18/24* (2023.01)

(58) Field of Classification Search
CPC ..... G06N 20/00; G06F 16/9024; G06F 18/24; G06F 18/214
See application file for complete search history.

(56) References Cited

U.S. PATENT DOCUMENTS

2016/0358101 A1    12/2016    Bowers et al.
2019/0188591 A1    6/2019    Kao et al.
(Continued)

FOREIGN PATENT DOCUMENTS

| CN | 108475252 A | 8/2018 |
| CN | 111279304 A | 6/2020 |
| JP | 2019079392 A | 5/2019 |

OTHER PUBLICATIONS

Ono et al., "Pipeline Profiler: A Visual Analytics Tool for The Exploration of Automl Pipelines," Cornell University, 2020, pp. 1-11.

(Continued)

*Primary Examiner* — Beau D Spratt
(74) *Attorney, Agent, or Firm* — Norton Rose Fulbright US LLP

(57) ABSTRACT

A device and computer implemented method. The method includes determining, in a representation of relationships between elements, an element representing a first characteristic of a machine learning pipeline, determining, in the representation, an element representing a second characteristic of the machine learning pipeline depending on the element representing the first characteristic, outputting an output for the element representing the second characteristic, detecting an input, in particular of a user, either determining a parameter of the machine learning pipeline depending on the element representing the second characteristic if the input meets a requirement or not determining the parameter of the machine learning pipeline depending on the element representing the second characteristic otherwise.

11 Claims, 3 Drawing Sheets

(51) Int. Cl.
*G06F 18/214* (2023.01)
*G06N 20/00* (2019.01)

(56) References Cited

U.S. PATENT DOCUMENTS

| | | | |
|---|---|---|---|
| 2020/0111012 A1* | 4/2020 | Wan | G06F 40/30 |
| 2020/0265324 A1 | 8/2020 | Ferreira Moreno et al. | |
| 2021/0073972 A1* | 3/2021 | Wu | G06N 3/08 |
| 2021/0097444 A1* | 4/2021 | Bansal | G06F 9/5066 |
| 2022/0036246 A1* | 2/2022 | Chen | G06N 5/022 |
| 2022/0067541 A1* | 3/2022 | Blanchard | G06F 16/90328 |
| 2022/0076144 A1* | 3/2022 | Ram | G06N 5/04 |
| 2023/0125189 A1* | 4/2023 | Chang | H04L 63/12 |
| | | | 726/26 |

OTHER PUBLICATIONS

Karlaš et al., "Ease.ML in Action: Towards Multi-Tenant Declarative Learning Services," Proceedings of The VLDB Endowment, vol. 11, No. 12, 2018, pp. 2054-2057.
J. Piazentin Ono, et al.: "PipelineProfiler: A Visual Analytics Tool for the Exploration of AutoML Pipelines", arXiv:2005.00160v2, (2020), pp. 1-11; XP081755398/.

* cited by examiner

DEVICE FOR AND METHOD OF AUTOMATING MACHINE LEARNING BASED ON A REPRESENTATION OF A MACHINE LEARNING PIPELINE

CROSS REFERENCE

The present application claims the benefit under 35 U.S.C. § 119 of European Patent Application EP 20201313.2 filed on Oct. 12, 2020, which is expressly incorporated herein by reference in its entirety.

BACKGROUND INFORMATION

The present invention concerns an automation of machine learning in particular the automation of a pipeline construction and a pipeline configuration.

Machine learning pipelines turn raw data into conclusions and functioning machine learning models.

The development of machine learning pipelines is a complex process that requires a deep understanding of the data and a necessary understanding of the domain and the problem to be addressed. This requires specialized training in information processing and data analysis, especially in machine learning.

SUMMARY

In accordance with the present invention, a device for automating machine learning and a computer implemented method of automating machine learning provide a white box way of semi-automated machine learning development supported by semantic technologies, which allows convenient scenario-adaptable construction and configuration of machine learning pipelines even by non-machine-learning-experts.

The device and the method enable explainable, extensible and configurable machine learning pipeline development, which can also be used by non-machine-learning-experts with minimal machine learning training. This is achieved by encoding domain knowledge and formal representation of machine learning knowledge with semantic technologies in machine learning pipelines.

The machine learning pipelines can be developed for multiple different datasets to solve several tasks with similarity. The machine learning pipelines are efficiently maintainable and extensible for future scenarios.

In accordance with an example embodiment of the present invention, the computer implemented method comprises determining, in a representation of relationships between elements, an element representing a first characteristic of a machine learning pipeline, determining, in the representation, an element representing a second characteristic of the machine learning pipeline depending on the element representing the first characteristic, outputting an output for the element representing the second characteristic, detecting an input, in particular of a user, either determining a parameter of the machine learning pipeline depending on the element representing the second characteristic if the input meets a requirement or not determining the parameter of the machine learning pipeline depending on the element representing the second characteristic otherwise.

The parameter configures the machine learning pipeline. The element representing the second characteristic makes the machine learning pipeline explainable to a non-machine-learning-expert user. The non-machine-learning-expert user can configure the machine learning pipeline via the input. Knowledge about the element representing the first characteristic of the machine learning pipeline is not required.

In one aspect of the present invention, the method comprises determining whether the element representing the first characteristic and the element representing the second characteristic have a relationship that meets a condition, in particular that the element representing the second characteristic is semantically reachable from the element representing the first characteristic in the representation according to a semantic encoded in the representation.

Outputting the output may comprise prompting a user for a response, in particular to like or dislike the second element or to select the element representing the second characteristic In accordance with an example embodiment of the present invention, the method preferably comprises determining the relationship with a function for evaluating a semantic reachability, detecting the response and modifying at least one parameter of the function depending on the response. This way, a reachability function is updated based on the input.

The method may comprise determining a linkage between two elements depending on the response, constructing a semantic reachability graph representing the relationship by storing machine learning templates that correspond to the two elements and the linkage between them in the semantic reachability graph.

The method may comprise determining a plurality of elements that are semantically reachable in the representation from the element representing the first characteristic, determining the element representing the second characteristic from the plurality of elements depending on the input. The user may select the element representing the second characteristic that is used for determining the parameter e.g., from a list.

The method may comprise determining another element representing the second characteristic that is semantically reachable in the representation from the element representing the first characteristic when the input fails to meet the requirement. The computation of the element that is used for the parameter may be repeated, e.g., if the user dislikes the second element.

In one aspect of the present invention, the method comprises determining the condition depending on the input. Thus the notion of semantic reachability is updated according to user preferences.

In one aspect of the present invention, the method comprises determining the parameter for a part of the machine learning pipeline, and determining the condition depending on a function of the part in the machine learning pipeline.

The method may comprise determining a group of elements depending on the input, and determining depending on the group of elements a plurality of parameters for the representation of the machine learning pipeline. This way multiple parameters that relate to the first element representing the characteristic of the machine learning pipeline are determined.

The method may comprise determining a machine learning model depending on the representation of the machine learning pipeline.

The method may comprise providing raw data comprising images, determining the parameter of the machine learning pipeline for an image classifier model, determining the machine learning model depending on the parameter, training the image classifier model with at least one image of the raw data. The so trained machine learning model is the image classifier model or comprises it.

The method may comprise providing an image, classifying the image with the machine learning model.

A device for determining a machine learning model is adapted to execute the method in accordance with example embodiments of the present invention.

Further advantageous embodiments are derivable from the following description and the figures.

DETAILED DESCRIPTION OF EXAMPLE EMBODIMENTS

Figure 1:
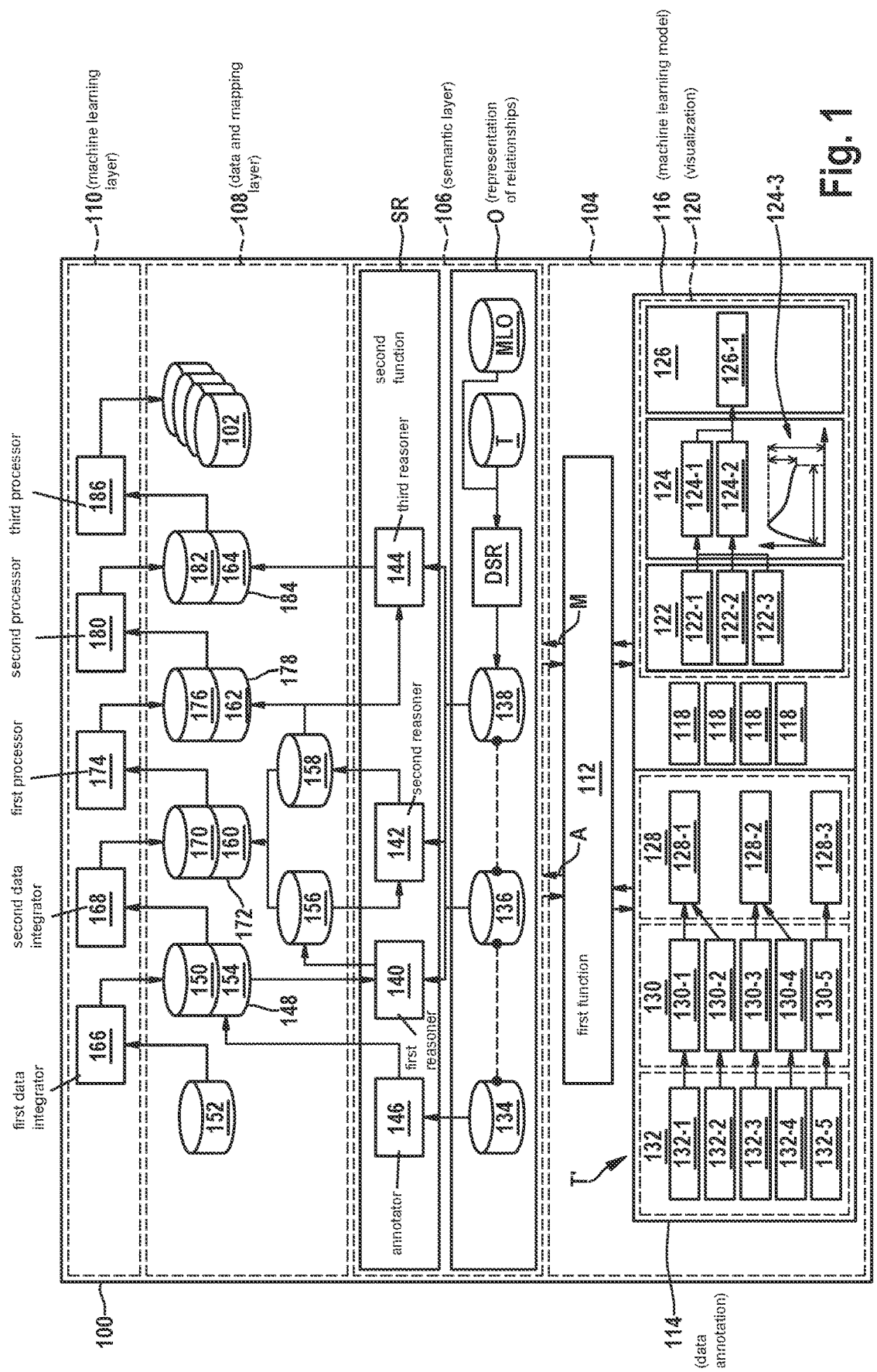
FIG. 1 schematically depicts a device for determining a machine learning model, in accordance with an example embodiment of the present invention.

FIG. 1 depicts a device 100 for determining a machine learning model 102.

The device 100 comprises a user interface layer 104, a semantic layer 106, a data and mapping layer 108 and a machine learning layer 110. The device 100 is adapted to executed computer implemented methods that will be described below.

The user interface layer 104 provides users an interface to use semantic components of the semantic layer 106, and thus the complete system.

The user interface layer 104 comprises a first function 112, adapted to dynamically visualize information about a data annotation 114 and about a machine learning model 116.

The user interface layer 104 may comprise a graphical user interface function for displaying information about the present data annotation 114 and about the machine learning model 116.

The first function 112 is adapted to retrieve information from a user regarding the data annotation 114 and/or the machine learning model 116 and/or a linkage L between machine learning ontology templates T.

In the example, a representation of a machine learning pipeline is selectable by the user by selecting it from a plurality of machine learning pipelines 118 displayed on the graphical user interface.

In the example the linkage L between machine learning ontology templates T is selectable by the user by selecting machine learning ontology templates T to be linked, from a plurality of machine learning templates displayed on the graphical user interface.

The information about the machine learning model 116 comprises a visualization 120.

The visualization 120 comprises feature groups 122. In the example, the feature groups 122 comprise icons for a first feature group 122-1, a second feature group 122-2 and a third feature group 122-3. The first feature group 122-1 in the example is a group for single features. The second feature group 122-2 in the example is a group for time series. The third feature group 122-3 in the example is a group for a quality indicator.

The visualization 120 comprises a graphical representation of a processing algorithm 124. The graphical representation of the processing algorithm 124 comprises an icon for a first algorithm 124-1, an icon for a second algorithm 124-2 and a diagram 124-3. The first algorithm 124-1 in the example is an algorithm for the first feature group 122-1, e.g., the group for single features. The second algorithm 124-2 in the example is an algorithm for the second group 122-2, e.g., the group for time series. The diagram 124-3 displays in the example a course of a resistance over time starting at an origin of a Cartesian coordinate system, having a length and having a peak (maximum) and a drop from the peak to an end value.

The visualization 120 comprises a graphical representation of a machine learning algorithm 126. The graphical representation of the machine learning algorithm 126 in the example comprises an icon 126-1 depicting an aspect of the machine learning algorithm 126.

The information about the present data annotation 114 comprises feature groups 128. In the example, the feature groups 128 comprise icons for the first feature group 128-1, the second feature group 128-2 and the third feature group 128-3.

The information about the present data annotation 114 comprises domain feature names 130. In the example, the domain feature names 130 comprise an icon for a first domain feature name 130-1, a second domain feature name 130-2, a third domain feature name 130-3, a fourth domain feature name 130-4, and a fifth domain feature name 130-5.

In the example, the first domain feature name 130-1 represents a status of data. In the example, the second domain feature name 130-2 represents a characteristic of data. In the example, the third domain feature name 130-3 represents a type of data. In the example, the fourth domain feature name 130-4 represents another type of data. In the example, the fifth domain feature name 130-5 represents a quality of data.

In the example, the first domain feature name 130-1 and the second domain feature name 130-2 are mapped to the first feature group 128-1. In the example, the third domain feature name 130-3 and the fourth domain feature name 130-4 are mapped to the second feature group 128-2. In the example, the fifth domain feature name 130-5 is mapped to the third feature group 128-3.

The information about the present data annotation 114 comprises raw feature names 132. In the example, the raw feature names 132 comprise icons for a first raw feature name 132-1, a second raw feature name 132-2, a third raw feature name 132-3, a fourth raw feature name 132-4, and a fifth raw feature name 132-5.

In the example, the first raw feature name 132-1 represents a status code of data. In the example, the second raw feature name 132-2 represents a characteristic of data. In the example, the third raw feature name 132-3 represents a type of data. In the example, the fourth raw feature name 132-4 represents another type of data. In the example, the fifth raw feature name 132-5 represents a quality of data.

In the example, the first raw feature name 132-1 is mapped to the first domain feature name 130-1. In the example, the second raw feature name 132-2 is mapped to the second domain feature name 130-2. In the example, the third raw feature name 132-3 is mapped to the third domain feature name 130-3. In the example, the fourth raw feature name 132-4 is mapped to the fourth domain feature name 130-4. In the example, the fifth raw feature name 132-5 is mapped to the fifth domain feature name 130-5.

The visualization 120 comprises a display T' of a plurality of machine learning ontology templates T that are linkable. A machine learning ontology template T may refer to one of the feature groups, one of the machine learning algorithms, one of the domain feature names, or one of the raw feature names and is represented by one of the icons.

The arrows connecting these items in FIG. 1 represent user-provided linkages L between these elements.

The semantic layer 106 comprises a representation O of relationships for a plurality of elements. More specifically, the representation O comprises a first ontology 134, a second ontology 136 and a third ontology 138.

The first ontology 134 in the example is a domain ontology that encodes the domain knowledge with formal representations, including classes and properties of the domain and their relationships.

The second ontology 136 in the example is a feature group ontology that stores the linkage between the domain ontology terms and feature groups in a pre-designed catalogue of machine learning pipelines.

The third ontology 138 in the example is a machine learning pipeline ontology, which encodes the machine learning knowledge with formal representations, including the allowed and default feature groups, suitable feature processing algorithms for the feature groups, corresponding feature processed groups, suitable machine learning modelling algorithms for each feature processed group and their relations. The third ontology 138 encodes in the example the catalogue. The catalogue stores some successful and fairly general machine learning pipelines pre-designed by machine learning experts in formal representations. Machine learning pipelines are pre-designed mappings from feature groups, to their feature processing algorithms for the feature group, to their corresponding feature processed groups, and their specified machine learning modelling algorithms for the feature processed groups.

The semantic layer 106 comprises a machine learning ontology MLO and machine learning ontology templates T.

The machine learning ontology MLO encodes machine learning knowledge with formal representations. The machine learning ontology MLO encodes for example what feature groups or combinations thereof are allowed or not allowed for processing input data and/or default feature groups for processing input data. The machine learning ontology MLO encodes for example what feature processing algorithms are suitable for which feature group. The machine learning ontology MLO encodes for example feature processed groups corresponding to the feature processing algorithms, suitable machine learning modelling algorithms for feature processed groups and/or their relations.

The machine learning ontology MLO in one aspect defines the allowed search space of semantic reachability graphs.

The machine learning ontology templates T are in one aspect fragments of ontologies with variables used to instantiate the third ontology 138, i.e., the machine learning pipeline ontology.

The semantic layer 106 comprises a Dynamic Extender, e.g., a dynamic smart reasoner DSR, that takes the machine learning pipeline ontology MLO and the machine learning templates T and the user-provided linkage L as input and dynamically extends, configures and constructs the third ontology 138, i.e., the machine learning pipeline ontology.

The third ontology 138, i.e., the machine learning pipeline ontology that is constructed using machine learning ontology MLO and templates T, encodes a semantic reachability graph G for sets of elements like feature groups, feature processing algorithms, feature processed groups, and their specified machine learning modelling algorithms for each feature processed group.

In one example, the semantic reachability graph G is constructed by linking the machine learning templates T using the linkage L.

The dynamic smart reasoner DSR in the example has two layers of functionalities.

Firstly, the dynamic smart reasoner DSR is configured to take the linkage L as the input and to link the machine learning templates T to dynamically configure, extend and construct the semantic reachability graph G.

In the example, an allowed search space of the semantic reachability graph G is defined based on the machine learning pipeline ontology MLO.

Secondly, the dynamic smart reasoner DSR is configured to take annotations A, e.g., of an input dataset D as input and to compute several sets of elements $S1, \ldots, Sn$ in the representation O that are semantically reachable from the linkage L and that possibly have a semantic reachability relation between each other. An element $Si$ that has a semantic reachability relation to another element $Sj$ is semantically reachable from that other element $Sj$.

The dynamic smart reasoner DSR is configured to update the semantic reachability relation dynamically in the semantic reachability graph G.

The semantic layer 106 comprises a second function SR. The second function SR comprises in the example a first reasoner 140, a second reasoner 142 and a third reasoner 144. The second function SR may include an annotator 146 as well.

The annotator 146 allows the user to annotate the raw data with terms from the first ontology 134, in the example the domain ontology.

The first function 112 may be adapted to determine an annotation A for data from user input. The second function SR may be adapted to receive the annotation A. The first function 112 may be adapted to determine a representation M of a machine learning pipeline from user input. The second function SR may be adapted to receive the representation M of a machine learning pipeline.

The first function 112 is adapted for an user interaction. More specifically, the first function 112 is adapted for determining and outputting an output prompting a user for a response. The first function 112 is in one aspect adapted for outputting a prompt displaying an element of the representation O for that the user interaction was initiated. The first function 112 may be adapted for requesting the user to like or dislike the element. The first function 112 may be adapted for requesting the user to select one or more of the elements from a list of elements. The first function 112 may be adapted for detecting an input by the user in response to the output. The first function 112 may be adapted for determining a result of the user interaction depending on the input. The first function 112 may be adapted for determining a result indicating that the element for that the user interaction was initiate is to be used for determining the machine learning pipeline or not. The first function 112 may be adapted for determining a result indicating one element or several elements of the list that have been selected by the user according to the input. The first function 112 may be adapted for determining as result a group of elements comprising the element for that the user interaction was initiated.

In one aspect, the first function 112 is adapted to determine at least one condition for evaluating a semantic reachability of elements in the representation O.

In the example, the annotator 146 is adapted to process the annotation A and elements from the first ontology 134 to determine a first dataset 148 comprising raw data 150 from a raw data lake 152 and a first mapping 154 of raw feature names from the raw data 150 to domain feature names according to the first ontology 134.

In the example, the first reasoner 140 is adapted to process the first mapping 154 to determine a second mapping 156 of domain feature names to feature groups according to the second ontology 136. The first reasoner 140 may be adapted for automatic generation and user configuration of the second mapping 156 based on the second ontology 136 and a users' configurations, and the result of the user interaction, e.g., the input from the user.

In the example, the second reasoner 142 is adapted to process the second mapping 156 to determine a third mapping 158 of feature groups to processing algorithms to feature processed groups according to the second ontology 136 and the third ontology 138. The second reasoner 142 may be adapted for automatic generation of the third mapping 158, based on the second ontology 136, the catalogue, e.g., based on the third ontology 138, the second mapping 156, a users' chosen representation M of the machine learning pipeline, and the result of the user interaction, e.g., the input from the user.

In the example, the second reasoner 142 is adapted to determine a fourth mapping 160 of domain names to feature groups to processing algorithms depending on the second mapping 156 and the third mapping 158, and the result of the user interaction, e.g., the input from the user.

In the example, the second reasoner 142 is adapted to determine a fifth mapping 162 of feature groups to feature processed groups depending on the third mapping 158, and the result of the user interaction, e.g., the input from the user.

In the example, the third reasoner 144 is adapted to determine a sixth mapping 164 of feature processed groups to machine learning algorithms depending on the third mapping 158. The third reasoner 144 may be adapted for automatic generation of sixth mapping based on the catalogue, e.g., based on the third ontology 138, users' chosen representation M of the machine learning pipeline, and the result of the user interaction, e.g., the input from the user.

The machine learning layer 110 comprises a first data integrator 166 adapted to determine the raw data 150 from the raw data lake 152. The machine learning layer 110 comprises a second data integrator 168 adapted to determine integrated data 170 depending on the first dataset 148. Raw data stored in the raw data lake 152 is transformed by the second data integration 168 into integrated data 170 that is suitable for machine learning. The integrated data 170 is provided for a second dataset 172 comprising the integrated data 170 and the fourth mapping 160.

The machine learning layer 110 comprises a first processor 174 adapted to determine features 176 for a third dataset 178 depending on the second dataset 172. The third dataset 178 comprises the features 176 and the fifth mapping 162.

The machine learning layer 110 comprises a second processor 180 adapted to determine selected features 182 for a fourth dataset 184 depending on the third dataset 178. The fourth dataset 184 comprises the selected features 182 and the sixth mapping 164.

The machine learning layer 110 comprises a third processor 186 adapted to determine the machine learning model 102 depending on the fourth dataset 184.

The data and mapping layer 108 comprises the raw data lake 152, the first dataset 148, the second dataset 172, the third dataset 178, the fourth dataset 184 and the machine learning model 102.

In FIG. 1, double lined arrows indicate information flow of data, solid arrows indicate information flow of semantics and dotted lines indicate connections by classes of elements in the representation O.

In the following an exemplary method of automatic machine learning pipeline construction and machine learning pipeline configuration is described. The automated method uses semantics, which allow the user interaction during an automated construction of a machine learning pipeline.

According to the method, the user needs to annotate data with domain ontology terms and select a pre-designed machine learning pipeline from the catalogue. The user may interact at intermediate steps of a cascade of steps for constructing a representation of the machine learning pipeline M. Everything else is automated. This is achieved by encoding domain knowledge and formal representation of machine learning knowledge with semantic technologies in the catalogue of pre-designed machine learning pipelines.

In one aspect, the representation of a machine learning pipeline M has parameters. The representation O may comprise a semantic that encodes domain and machine learning knowledge. The semantic comprises a plurality of elements representing either domain knowledge or machine learning knowledge and their relationships.

In one aspect, when an annotation A is provided, a first element in the representation O is determined depending on the annotation A. Then a second element in the representation O may be determined depending on the first element. In the example, the second element is determined so that the first element and the second element have a relationship that meets a first condition. The first condition may be that the second element is semantically reachable from the first element in the representation O according to the semantic encoded in the representation O. When the first element and the second element meet the first condition the parameter is determined depending on the second element. Otherwise the parameter is not determined depending on the second element.

In another aspect, a third element in the representation O may be determined depending on the second element. In the example the second element and the third element have a relationship that meets a second condition. The second condition may be that the third element is semantically reachable from the second element in the representation O. In this aspect, the parameter may be determined depending on the second element and the third element if the second condition is met. Otherwise the parameter may not be determined depending on the second element and the third element.

For example, an element S1 can instantiate a first parameter P1 with a feature group appearing in the representation O.

For example, an element S2 can instantiate a second parameter P2 with a processing algorithm or processing algorithms appearing in the representation O that are semantically reachable from the feature groups of the element S1.

For example, an element S3 can instantiate a third parameter P3 with a processed feature group or processed feature groups appearing in the representation O that are semantically reachable from one processing algorithm or from the processing algorithms of the element S2.

For example, an element S4 can instantiate a fourth parameter P4 with processed features appearing in the representation O that are semantically reachable from the processed feature group or the processed feature groups of the element S3.

For example, an element S5 can instantiate a fifth parameter P5 with a machine learning algorithm or with machine learning algorithms appearing in the representation O that are semantically reachable from the processed feature or the processed features of the element S4.

Since ontologies are not graphs the notion of semantic reachability can vary and depend on use-cases and application.

In one aspect the semantically reachable may be determined based on projecting one or more of the aforementioned ontologies on graph structures and computing a graph-reachability. This graph structures can also account for cohesiveness of paths between ontology elements. It can account for explicit and implicit relationships between elements of the representation O.

Figure 2:
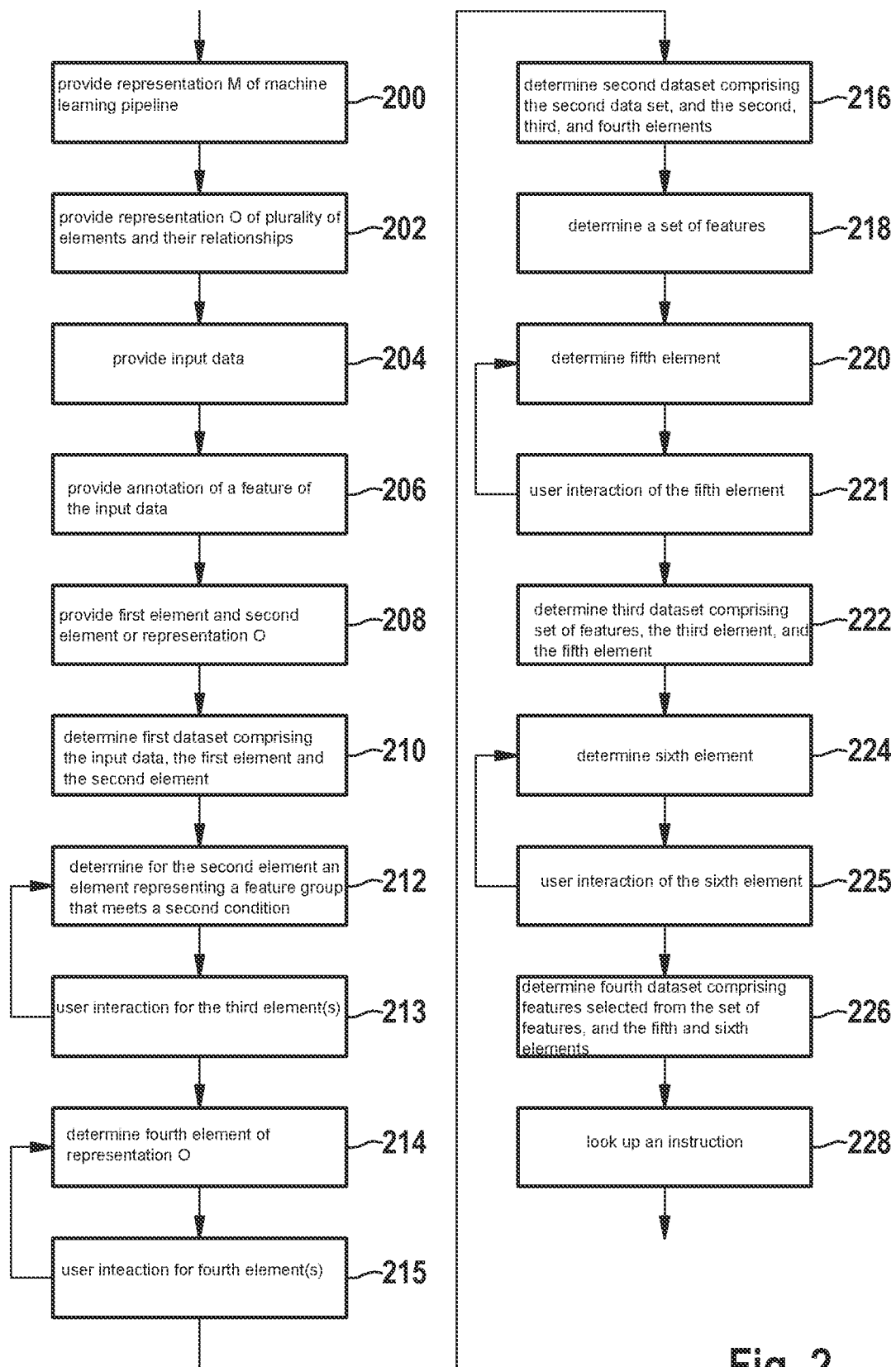
FIG. 2 schematically depicts steps in a method for determining the machine learning model, in accordance with an example embodiment of the present invention.

In the following the method is described with reference to FIG. 2. The method is by way of example for a machine learning pipeline having parameters P1, . . . , Pk. The machine learning pipeline may have sets of parameters that are represented by an element in the representation O.

The method comprises a step 200 of providing the representation M of a machine learning pipeline having the parameters P1, . . . , Pk.

Providing the representation M may comprise detecting a user input identifying one of the plurality of representations 118 of the machine learning pipelines, and selecting the representation M of the machine learning pipeline identified in the user input.

The method comprises a step 202 of providing the representation O. The representation O comprises a plurality of elements and their relationships.

The representation O in the example comprises the first ontology 134, the second ontology 136 and the third ontology 138. A graph representing these may be used alike.

The method comprises a step 204 of providing input data.

The method comprises a step 206 of providing an annotation A of a feature of the input data, in particular a name of a variable in the input data.

The method comprises a step 208 of providing a first element and a second element of the representation O. Providing the first element comprises in the example determining for the annotation A an element of the representation O representing the feature of the input data in the representation O. In an example a name of the variable of the input data according to the first ontology is determined.

Providing the second element comprises in the example determining for the first element an element of the representation O representing a feature name in the representation O. In an example a name of the variable in a domain according to the first ontology is determined.

The second element may be determined in the representation O depending on the first element so that the first element and the second element have a relationship that meets the first condition. This means in the example, that the second element is semantically reachable from the first element in the representation O according to the semantic encoded in the representation O. A plurality of second elements may be determined that meet the first condition. The method is described for one of these second element and applies to any number of these second elements alike.

The method further comprises a step 210 of determining the first dataset 148 comprising the input data 150, the first element and the second element.

The method further comprises a step 212 of determining a third element in the representation O representing a feature group.

The first parameter P1 may be determined depending on the third element.

The step 212 in the example comprises determining for the second element an element of the representation O representing a feature group in the representation O that meets a second condition, in particular according to the second ontology 136. The method is described for one of these third elements and applies to any number of these third elements alike.

The third element may be determined in the representation O depending on the second element so that the third element is semantically reachable from the second element in the representation O.

The third element may be determine according to the second ontology 136.

The method may comprise determining a plurality of third elements that are semantically reachable in the representation O of relationships between elements from the second element.

The method optionally comprises a step 213 of user interaction for the third element or the plurality of third elements.

The user interaction will be described below referencing FIG. 3. The first parameter P1 may be determined depending on the third element or not depending on a result of the user interaction for the third element.

When the result of the user interaction indicates that the third element meets a first requirement, a step 214 is executed. Otherwise the step 212 is executed. The first requirement may be met if the third element is liked or selected by the user. Otherwise the first requirement may not be met.

The second condition may be updated, changed or determined depending on the result of the user interaction for executing the step 212 with an updated notion of semantic reachability.

The second condition may be updated, changed or determined depending on a function of the part in the machine learning pipeline that the first parameter P1 is used for.

The result of the user interaction may indicate a group of elements comprising the third element that is determined depending on input received in the user interaction as described below. The method may comprise determining a plurality of parameters for the representation of the machine learning pipeline M including the parameter for the third element depending on the group of elements.

The method further comprises the step 214 of determining a fourth element in the representation O. Determining the fourth element in the example comprises determining for the third element an element of the representation O representing a processing algorithm that meets a third condition. The fourth element may be determined in the representation O depending on the third element so that the fourth element is semantically reachable from the third element. The fourth element represents a processing algorithm for the feature group represented by the third element. The second parameter P2 may be determined depending on the fourth element. The method is described for one of these fourth elements and applies to any number of these fourth elements alike.

The fourth element may be determine according to the third ontology 138.

The method may comprise determining a plurality of fourth elements that are semantically reachable in the representation O of relationships between elements from the third element.

The method optionally comprises a step 215 of user interaction for the fourth element or the plurality of fourth elements.

The user interaction will be described below referencing FIG. 3.

The second parameter P2 may be determined depending on the fourth element or not depending on a result of the user interaction for the fourth element.

When the result of the user interaction indicates the fourth element meets a second requirement, a step 216 is executed. Otherwise the step 214 is executed.

The second requirement may be met if the fourth element is liked or selected by the user. Otherwise the second requirement may not be met.

The third condition may be updated, changed or determined depending on the result of the user interaction for executing the step 214 with an updated notion of semantic reachability.

The third condition may be updated, changed or determined depending on a function of the part in the machine learning pipeline that the second parameter P2 is used for.

The result of the user interaction may indicate a group of elements comprising the fourth element that is determined depending on input received in the user interaction as described below. The method may comprise determining a plurality of parameters for the representation of the machine learning pipeline M including the parameter for the fourth element depending on the group of elements.

The method further comprises the step 216 of determining the second dataset 172 comprising the second data set, the second element, the third element, and the fourth element.

The method further comprises a step 218 of determining a set of features 176 by processing the second dataset 172 with the processing algorithm represented by the fourth element.

The method further comprises a step 220 of determining a fifth element. Determining the fifth element in the example comprises determining for the third element an element of the representation O representing the set of features 172 that meets a fourth condition. In the example, the fifth element is determined so that the fifth element is semantically reachable from the third element in the representation O and that the fifth element is semantically reachable from the fourth element in the representation O. The fifth element represents in the example a processed feature group or processed feature groups.

The method may comprise determining a plurality of fifth elements that are semantically reachable in the representation O of relationships between elements from the third element and the fourth element.

The method optionally comprises a step 221 of user interaction for the fifth element or the plurality of fourth elements.

The user interaction will be described below referencing FIG. 3.

The third parameter P3 may be determined depending on the fifth element or not depending on a result of the user interaction for the fifth element. The fourth parameter P4 may be instantiated with processed features, i.e., with the set of features 176, or not depending on a result of the user interaction for the fifth element.

When the result of the user interaction indicates that the fifth element meets a third requirement, a step 222 is executed. Otherwise the step 220 is executed.

The third requirement may be met if the fifth element is liked or selected by the user. Otherwise the third requirement may not be met.

The fourth condition may be updated, changed or determined depending on the result of the user interaction for executing the step 220 with an updated notion of semantic reachability.

The fourth condition may be updated, changed or determined depending on a function of the part in the machine learning pipeline that the third parameter P3 is used for.

The fourth condition may be updated, changed or determined depending on a function of the part in the machine learning pipeline that the fourth parameter P4 is used for.

The result of the user interaction may indicate a group of elements comprising the fifth element that is determined depending on input received in the user interaction as described below. The method may comprise determining a plurality of parameters for the representation of the machine learning pipeline M including the parameter for the fifth element depending on the group of elements.

The method further comprises the step 222 of determining the third dataset 178 comprising the set of features 176, the third element and the fifth element.

The method further comprises a step 224 of determining a sixth element. Determining the sixth element comprises determining for the fifth element an element of the representation O representing a machine learning modelling algorithm that meets a fifth condition. In the example, the sixth element is determined so that the sixth element is semantically reachable from the fifth element in the representation O.

The method may comprise determining a plurality of sixth elements that are semantically reachable in the representation O of relationships between elements from the fifth element.

The method optionally comprises a step 225 of user interaction for the sixth element or the plurality of sixth elements.

The user interaction will be described below referencing FIG. 3.

The fifth parameter P5 may be determined depending on a machine learning algorithm or machine learning algorithms represented by the sixth element or not depending on a result of the user interaction for the sixth element.

When the result of the user interaction indicates the sixth element that is used, a step 226 is executed. Otherwise the step 224 is executed.

The fifth condition may be updated, changed or determined depending on the result of the user interaction for executing the step 224 with an updated notion of semantic reachability.

The fifth condition may be updated, changed or determined depending on a function of the part in the machine learning pipeline that the fifth parameter P5 is used for.

The result of the user interaction may indicate a group of elements comprising the sixth element that is determined depending on input received in the user interaction as described below. The method may comprise determining a plurality of parameters for the representation of the machine learning pipeline M including the parameter for the sixth element depending on the group of elements.

The method further comprises the step 226 of determining a fourth dataset 184 comprising features selected from the set of features 176, the fifth element and the sixth element.

The method further comprises a step 228 of looking up an instruction for processing data and/or data that is defined for the fourth dataset 184 according to the sixth element.

This way the machine learning pipeline turns raw input data into conclusions and functioning machine learning models.

The machine learning pipeline may be applied for example to provide an image classifier model. The image classifier model may be used for monitoring and process control based on images that are taken during a process. The process may be resistance welding. The images may depict a part that is welded and/or a weldseam.

Training images from the process or a simulation thereof may be annotated by the user for the purpose of training the image classifier model. In the user interaction, the user may select the features that shall be used for image classification from the domain feature names. In the user interaction, the user may select a specific processing algorithm for processing or classifying the images. The machine learning modelling algorithm may be determined automatically from the user selection. The machine learning modelling algorithm may be executed with the parameters according to the representation of the machine learning pipeline M to form the trained machine learning model from the training images automatically.

For training, the raw data 150 comprises images. In the training at least one parameter of the machine learning pipeline M is determined that is a parameter for the image classifier model. The parameter for the image classifier model may be a hyperparameter or a weight of an artificial neural network. The machine learning model is determined depending on the parameter and trained with at least one image of the raw data 150.

After the training, an image may be classified with the so trained machine learning model.

In the method described above, the user interacts at intermediate steps for constructing the representation of the machine learning pipeline M.

The parameter or the parameters for a step correspond to parts of the machine learning pipeline and are determined semi-automatically. In this context semi-automatically means that the step of the cascade is repeated in iterations until the result of the user interaction indicates that the user has selected or liked the element or elements of the corresponding part of the machine learning pipeline.

In the user interaction, an element that represents a first characteristic of the machine learning pipeline M is determined in the representation O of relationships between elements. Depending on which step of the cascade is processed, this element may be the second element, the third element, the fourth element or the fifth element.

In the user interaction, an element representing a second characteristic of the machine learning pipeline M is determined in the representation O depending on the element representing the first characteristic. Which element is determined, depends on the step of the cascade that is processed. In the corresponding user interaction, the third element is determined depending on the second element, the fourth element is determined depending on the second and the third element, the fifth element is determined depending on the fourth element, or the sixth element is determined depending on the fifth element.

The element that represents the first characteristic and the element that represents the second characteristic have a relationship that meets the condition for evaluating the semantic reachability that is applicable to the step of the cascade.

When a graph is used for evaluating semantic reachability, nodes of the graph may represent these elements. The condition may be determined from a property of a first node in the graph for the element that represents the first characteristic. Whether this condition is met or not may be determined depend on a property of a second node in the graph for the element that represents the second characteristic. In an example, the condition is defined by the property of the first node and that the second node is semantically reachable from the first node, if the property of the second node meets the condition. A change of the condition is for example stored in the graph as a updated or new property of the first node or the second node.

Figure 3:
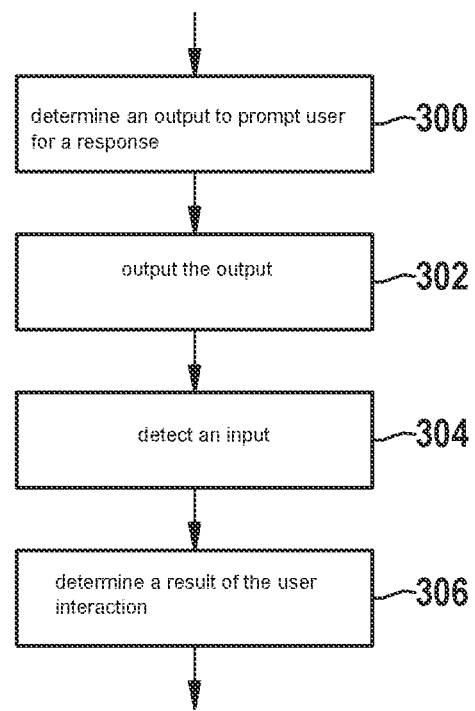
FIG. 3 schematically depicts aspects of a user interaction, in accordance with an example embodiment of the present invention.

FIG. 3 depicts steps in the user interaction for the iteration.

In a step 300, the user interaction comprises determining an output to prompt a user for a response.

The output is for example a prompt displaying the element for that the user interaction was initiated. The prompt may request the user to like or dislike the element. The prompt may request the user to select the element.

When the user interaction is initiated for a group of elements, the prompt may comprise a list of the elements in the group and a request to select one or more of the elements.

The user interaction includes a step 302 of outputting the output. In the example, the prompt is displayed to the user.

The user interaction includes a step 304 of detecting an input. The input may be a like or dislike attribute for an element displayed to the user or a selection of an element from the plurality of elements, e.g., the list of elements that is displayed to the user.

The input may be used for either determining a parameter of the machine learning pipeline M depending on the element, if the element is selected or not determining the parameter of the machine learning pipeline M depending on the element otherwise.

The user interaction may include determining the relationship with a function for evaluating a semantic reachability. In the example this function is the function of the part in the machine learning pipeline that the parameter, for which the user interaction is executed, is used for. In this case, the user interaction may include detecting the response and modifying at least one parameter of the function depending on the response.

In the example, the function is implemented as follows:

The dynamic smart reasoner DSR takes the linkage L as the input and links the machine learning template T to dynamically configure, extend and/or construct the semantic reachability graph G.

In the example, an allowed search space of the semantic reachability graph G is defined based on the machine learning pipeline ontology MLO.

The dynamic smart reasoner DSR takes annotations A as input and computes several sets of elements S1, . . . , Sn in the representation O that are semantically reachable due to the linkage L and that possibly have a semantic reachability relation between each other.

In the example, the dynamic smart reasoner DSR updates the third ontology 138, i.e., the machine learning pipeline ontology dynamically.

The function may determine if the condition is met or not. For example the function may indicate that the element representing the second characteristic is semantically reachable from the element representing the first characteristic in the representation according to the semantic encoded in the representation if the condition is met, or not indicate this otherwise.

The user interaction includes a step 306 of determining a result of the user interaction depending on the input.

The result may indicate that the element for that the user interaction was initiate is to be used for determining the machine learning pipeline or not.

The result may indicate one element or several elements of the plurality of elements, in particular the elements selected by the user according to the input.

The result may indicate another group of elements comprising the element for that the user interaction was initiated.

What is claimed is:

1. A computer implemented method, comprising the following steps:
   determining, in a representation of relationships between elements, an element representing a first characteristic of a machine learning pipeline;
   determining, in the representation, an element representing a second characteristic of the machine learning pipeline depending on the element representing the first characteristic;
   outputting an output for the element representing the second characteristic;
   detecting an input of a user;
   either determining a parameter of the machine learning pipeline depending on the element representing the second characteristic when the input meets a requirement or not determining the parameter of the machine learning pipeline depending on the element representing the second characteristic where the input does not meet the requirement;
   determining a machine learning model depending on the representation of the machine learning pipeline;
   providing raw data including images;
   determining the parameter of the machine learning pipeline for an image classifier model;
   determining the machine learning model depending on the parameter;
   training the image classifier model with at least one image of the raw data;
   determining whether the element representing the first characteristic and the element representing the second characteristic have a relationship that meets a condition, the condition being that the element representing the second characteristic is semantic ally reachable from the element representing the first characteristic in the representation according to a semantic encoded in the representation; and
   determining the condition depending on the input.

2. The method according to claim 1, wherein the outputting of the output includes prompting a user for a response, including: (i) to like or dislike the element representing the second characteristic, or (ii) to select the element representing the second characteristic.

3. The method according to claim 2, further comprising:
   determining the relationship with a function for evaluating a semantic reachability; and
   detecting the response and modifying at least one parameter of the function depending on the response.

4. The method according to claim 3, further comprising:
   determining a linkage between two elements depending on the response;
   constructing a semantic reachability graph representing the relationship by storing machine learning templates that correspond to the two elements and the linkage between them in the semantic reachability graph.

5. The method according to claim 1, further comprising:
   determining a plurality of elements that are semantically reachable in the representation from the element representing the first characteristic; and
   determining the element representing the second characteristic from the plurality of elements depending on the input.

6. The method according to claim 1, further comprising:
   determining another element representing the second characteristic that is semantically reachable in the representation from the element representing the first characteristic when the input fails to meet the requirement.

7. The method according to claim 1, further comprising:
   determining the parameter for a part of the machine learning pipeline; and
   determining the condition depending on a function of the part in the machine learning pipeline.

8. The method according to claim 1, further comprising:
   determining a group of elements depending on the input; and
   determining depending on the group of elements a plurality of parameters for the representation of the machine learning pipeline.

9. The method according to claim 1, further comprising:
   providing a first image; and
   classifying the first image with the machine learning model.

10. A device for determining a machine learning model, the device configured to:
    determine, in a representation of relationships between elements, an element representing a first characteristic of a machine learning pipeline;
    determine, in the representation, an element representing a second characteristic of the machine learning pipeline depending on the element representing the first characteristic;
    output an output for the element representing the second characteristic;
    detect an input of a user; and
    either determine a parameter of the machine learning pipeline depending on the element representing the second characteristic when the input meets a requirement or not determine the parameter of the machine learning pipeline depending on the element representing the second characteristic where the input does not meet the requirement,
    wherein:
      the machine learning model is determined depending on the representation of the machine learning pipeline;
      raw data including images is provided;
      the parameter of the machine learning pipeline for an image classifier model is determined;
      the machine learning model is determined depending on the parameter;
      the image classifier model is trained with at least one image of the raw data;
      whether the element representing the first characteristic and the element representing the second characteristic have a relationship that meets a condition is determined, the condition being that the element representing the second characteristic is semantically reachable from the element representing the first characteristic in the representation according to a semantic encoded in the representation; and
      the condition is determined depending on the input.

11. A non-transitory computer-readable medium on which is stored a computer program including computer readable instructions, the computer readable instructions, when executed by a computer, causing the computer to perform:
    determining, in a representation of relationships between elements, an element representing a first characteristic of a machine learning pipeline;

determining, in the representation, an element representing a second characteristic of the machine learning pipeline depending on the element representing the first characteristic;

outputting an output for the element representing the second characteristic;

detecting an input of a user; and either determining a parameter of the machine learning pipeline depending on the element representing the second characteristic when the input meets a requirement or not determining the parameter of the machine learning pipeline depending on the element representing the second characteristic where the input does not meet the requirement, wherein:

a machine learning model is determined depending on the representation of the machine learning pipeline;

raw data including images is provided;

the parameter of the machine learning pipeline for an image classifier model is determined;

the machine learning model is determined depending on the parameter;

the image classifier model is trained with at least one image of the raw data;

whether the element representing the first characteristic and the element representing the second characteristic have a relationship that meets a condition is determined, the condition being that the element representing the second characteristic is semantically reachable from the element representing the first characteristic in the representation according to a semantic encoded in the representation; and the condition is determined depending on the input.

* * * * *